(12) United States Patent
Murakami et al.

(10) Patent No.: US 10,057,058 B2
(45) Date of Patent: Aug. 21, 2018

(54) QUANTUM-KEY DISTRIBUTION APPARATUS, QUANTUM-KEY DISTRIBUTION METHOD, AND COMPUTER PROGRAM PRODUCT

(71) Applicant: Kabushiki Kaisha Toshiba, Minato-ku (JP)

(72) Inventors: Akira Murakami, Kawasaki (JP); Yoshimichi Tanizawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 221 days.

(21) Appl. No.: 15/001,898

(22) Filed: Jan. 20, 2016

(65) Prior Publication Data

US 2016/0277183 A1 Sep. 22, 2016

(30) Foreign Application Priority Data

Mar. 18, 2015 (JP) ................. 2015-055322

(51) Int. Cl.
*H04L 9/08* (2006.01)
(52) U.S. Cl.
CPC .................. *H04L 9/0858* (2013.01)
(58) Field of Classification Search
CPC ..................................... H04L 9/858
USPC ...................................... 380/278
See application file for complete search history.

(56) References Cited

U.S. PATENT DOCUMENTS

| 8,184,989 B2 | 5/2012 | Maeda et al. | |
| 2009/0169015 A1* | 7/2009 | Watanabe | H04L 9/0858 380/278 |
| 2015/0215122 A1* | 7/2015 | Takahashi | H04L 9/0883 380/283 |

FOREIGN PATENT DOCUMENTS

JP 4957952 6/2012

OTHER PUBLICATIONS

Charles H. Bennett et al. "Quantum Cryptography: Public Key Distribution and Coin Tossing", in Proceedings IEEE International Conference on Computers, Systems & Signal Processing, Bangalore, India, Dec. 1984, 5 Pages.
Peter W. Shor et al. "Simple Proof of Security of the BB84 Quantum Key Distribution Protocol", Physical Review Letters, vol. 85, No. 2, Jul. 10, 2000, 4 Pages.

(Continued)

*Primary Examiner* — Jacob Lipman
(74) *Attorney, Agent, or Firm* — Oblon, McClelland, Maier & Neustadt, L.L.P.

(57) ABSTRACT

According to an embodiment, a quantum-key distribution apparatus includes a quantum-key sharer, a shifter, a corrector, a privacy amplifier, and an estimator. The quantum-key sharer performs photon sharing processing and acquires a photon bit string. The shifter generates a shared bit string by performing shifting processing. The corrector generates a corrected bit string by correcting errors in the shared bit string by performing error correction processing. The privacy amplifier generates an encryption key by performing privacy amplification processing that compresses the corrected bit string. The estimator estimates an encryption-key generation rate based on an output value and a given value at execution phases of respective pieces of processing of the photon sharing processing, the shifting processing, the error correction processing, and the privacy amplification processing.

11 Claims, 8 Drawing Sheets

(56) References Cited

OTHER PUBLICATIONS

Z. L. Yuan et al. "Gigahertz quantum key distribution with InGaAs avalanche photodiodes", Applied Physics Letters, vol. 92, Issue:20. 201104-1, May 19, 2008, 4 Pages.

M. Lucamarini et al. "Efficient decoy-state quantum key distribution with quantified security", Optics Express,24550, vol. 21, No. 21, DOI:10-1364/OE.21.024550, Aug. 2, 2013, 16 Pages.

* cited by examiner

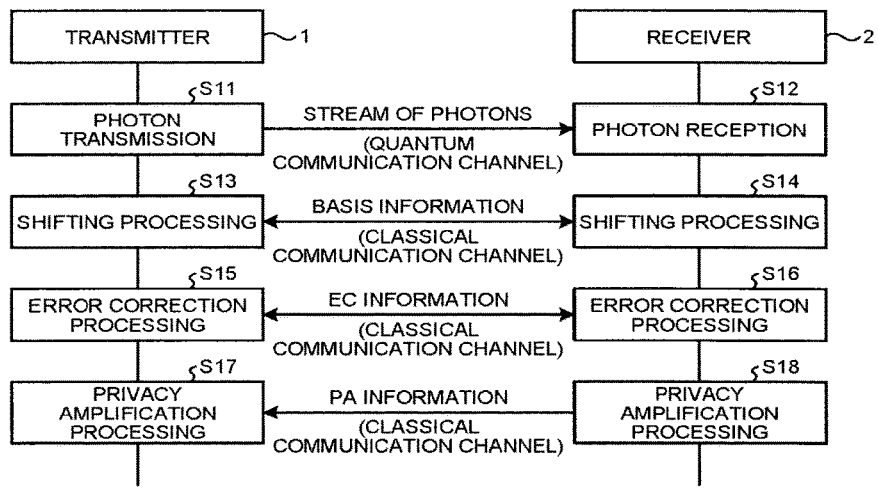

SECURE KEY RATE
ESTIMATION RESULT

ESTIMATED VALUE: XXXX
INITIAL VALUE: YYYY
CHANGE RATE: ZZZ

SECURE KEY RATE
ESTIMATION RESULT

ESTIMATED VALUE   INITIAL VALUE exchange control information with each other, and thereby the transmitter and the receiver share an encryption key between them. This technology is implemented by a technology generally referred to as quantum key distribution (QKD).

QUANTUM-KEY DISTRIBUTION APPARATUS, QUANTUM-KEY DISTRIBUTION METHOD, AND COMPUTER PROGRAM PRODUCT

CROSS-REFERENCE TO RELATED APPLICATION

This application is based upon and claims the benefit of priority from Japanese Patent Application No. 2015-055322, filed on Mar. 18, 2015; the entire contents of which are incorporated herein by reference.

FIELD

An embodiment described herein relates generally to a quantum-key distribution apparatus, a quantum-key distribution method, and a computer program product.

BACKGROUND

A quantum-key distribution system includes a transmitter, a receiver, and an optical fiber link that connects the foregoing. The transmitter transmits a stream of single photons to the receiver via the optical fiber link (a quantum communication channel) that is a communication channel of an optical fiber. Thereafter, the transmitter and the receiver exchange control information with each other, and thereby the transmitter and the receiver share an encryption key between them. This technology is implemented by a technology generally referred to as quantum key distribution (QKD).

To share the encryption key between the transmitter and the receiver by the quantum key distribution, there is the need to perform key distillation processing on each of the transmitter and the receiver. The key distillation processing is composed of shifting processing, error correction processing, and privacy amplification processing. By this key distillation processing, the transmitter and the receiver share the encryption key. The shared encryption key is used, as a key of one-time pad, when encrypted data communication is performed between the transmitter and the receiver or between applications coupled to the respective apparatuses. In the encrypted data communication by the encryption key of a one-time pad, by information theory, it has been assured that no eavesdropper having any knowledge can decipher it.

In the quantum key distribution, the photon used to share the encryption key has the uncertainty principle that is one of the fundamental principles in quantum mechanics in which the physical state thereof changes by being observed. By this principle, when an eavesdropper observed, on a quantum communication channel, photons including information on an encryption key transmitted by the transmitter, the physical state of the photons is changed and thereby the receiver that received the photons can tell that the photons have been observed by the eavesdropper. At that time, the change in the physical state of the photons appears as a quantum bit error rate (QBER) of the link (quantum communication channel) between the transmitter and the receiver. When an eavesdropper attempts to observe photons, the receiver and the transmitter can tell the presence of the eavesdropper because the physical state of the photons is changed and the QBER is increased.

The generation amount of encryption keys shared per unit time is referred to as a secure key rate (an encryption-key generation rate). As the number of encryption keys being available increases, encrypted data communication becomes faster and safer, and thus a higher secure key rate can implement a high-performance quantum-key distribution system. In a quantum-key distribution system, at the time of starting up the apparatus or as part of maintenance work at the time of recovering from a fault and the like, there is the need to set adjustment items in respective pieces of processing, in encryption-key generation operation of the transmitter and the receiver, to improve the secure key rate. As such a quantum-key distribution system, there is one that makes adjustments in the operation, out of the encryption-key generation operation, of transmitting photons to a receiver from a transmitter via a quantum communication channel.

As for the information necessary to calculate the secure key rate, however, the accurate value thereof is not known until the entire processing in the encryption-key generation operation is completed. At a phase in the middle of the encryption-key generation operation, it is not easy to instantaneously determine what effect the current settings have on the secure key rate that is finally obtained. In the above-described system, although the adjustments in the operation of transmitting photons are made, it is not sufficient to improve the secure key rate because it does not set the adjustment items in other processing of the encryption-key generation operation. It is therefore necessary to determine what adjustment items ought to be changed by trial and error and by reference to the experience of past adjustment work, and thus the maintenance work takes time and the cost for system maintenance increases.

BRIEF DESCRIPTION OF THE DRAWINGS

FIG. 4 is a sequence diagram illustrating one example of encryption-key generation operation of the QKD apparatus;

FIG. 5 is a table illustrating information for obtaining estimated values in respective pieces of processing;

DETAILED DESCRIPTION

According to an embodiment, a quantum-key distribution apparatus includes a quantum-key sharer, a shifter, a corrector, a privacy amplifier, and an estimator. The quantum-key sharer is configured to perform photon sharing processing in which a stream of photons is shared with another quantum-key distribution apparatus by quantum key distribution via a quantum communication channel for photons and to acquire a photon bit string corresponding to the stream of photons based on generated basis information. The shifter is configured to generate a shared bit string from the photon bit string by performing shifting processing based on the basis information on the quantum-key sharer and on the another quantum-key distribution apparatus. The corrector is configured to generate a corrected bit string by correcting errors included in the shared bit string by performing error correction processing. The privacy amplifier is configured to generate encryption keys by performing privacy amplification processing in which the corrected bit string is compressed based on the number of errors. The estimator is configured to estimate, at execution phases of respective pieces of processing of the photon sharing processing, the shifting processing, the error correction processing, and the privacy amplification processing, an encryption-key generation rate indicative of a generation amount of the encryption keys per unit time based on an output value output in processing that has been performed out of the respective pieces of processing and a given value corresponding to an output value of processing not yet performed out of the respective pieces of processing.

With reference to the accompanying drawings, the following describes in detail a quantum-key distribution apparatus, a quantum-key distribution method, and a computer program according to an exemplary embodiment. In the description of the drawings, the same portions are given the same reference signs. The drawings, however, are schematic, and thus the specific configuration should be determined in consideration of the following descriptions.

EMBODIMENT

Figure 1:
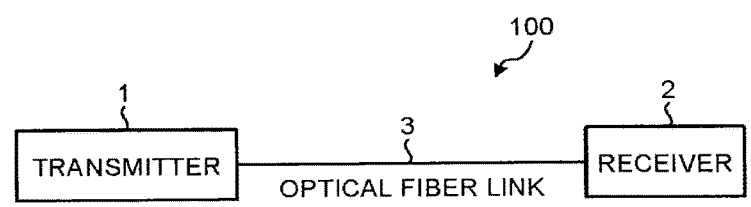
FIG. 1 is a block diagram illustrating one example of the configuration of a quantum-key distribution system.

FIG. 1 is a block diagram illustrating one example of the configuration of a quantum-key distribution system according to an embodiment. With reference to FIG. 1, the configuration of a quantum-key distribution system 100 will be described.

As illustrated in FIG. 1, the quantum-key distribution system 100 includes a transmitter 1, a receiver 2, and an optical fiber link 3. In the following description, as illustrated in FIG. 1, the quantum-key distribution system 100 that is composed of one each of the transmitter 1 and the receiver 2 will be explained. However, with the single receiver 2, what is called a quantum access network (QAN) in which a plurality of transmitters 1 are connected thereto via an optical device may be integrated with the quantum-key distribution system. It may be a quantum-key distribution system in which the receiver 2 having a plurality of interfaces for optical fiber communication and a plurality of transmitters 1 are connected via those interfaces. In the foregoing systems, the transmitter 1 and the receiver 2 may be conversely configured.

The transmitter 1 is an apparatus that transmits a stream of photons composed of single photons that are generated by a laser and are the basis of encryption key generation to the receiver 2 via the optical fiber link 3. The transmitter 1 performs later-described key distillation processing (shifting processing, error correction processing, and privacy amplification processing) on the basis of the transmitted stream of photons and generates encryption keys. The transmitter 1 further performs data communication with the receiver 2 via a classical communication channel implemented by a communication cable such as an Ethernet (registered trademark) cable other than the quantum communication channel implemented by the optical fiber link 3. The data communicated via the classical communication channel may be control data necessary for the above-described key distillation processing or may be general data other than the control data.

The receiver 2 is an apparatus that receives the stream of photons composed of single photons that are the basis of encryption key generation from the transmitter 1 via the optical fiber link 3. The receiver 2 performs the later-described key distillation processing (shifting processing, error correction processing, and privacy amplification processing) on the basis of the received stream of photons and generates the encryption keys identical to those generated by the transmitter 1. That is, the transmitter 1 and the receiver 2 are to generate and share the identical encryption keys. The receiver 2 further performs the data communication with the transmitter 1 via the classical communication channel implemented by the communication cable such as an Ethernet cable other than the quantum communication channel implemented by the optical fiber link 3.

The optical fiber link 3 is an optical fiber cable that functions as a quantum communication channel that is to be a transmission channel for single photons output by the transmitter 1. Although not depicted in FIG. 1, the transmitter 1 and the receiver 2 are connected via a communication cable (classical communication channel) that performs communication with normal digital data of "0" and "1" in addition to the optical fiber link 3. The classical communication channel does not need to be wired and it may be wireless.

While it has been described that the optical fiber link 3 functions as the quantum communication channel and the communication cable not depicted such as an Ethernet cable functions as the classical communication channel, it is not limited to this. For example, the optical fiber link 3 may be configured to serve, by a wavelength division multiplex (WDM) technology, as a photon communication channel to transmit and receive photons, and an optical data communication channel to perform optical data communication. That is, in this case, the photon communication channel of the optical fiber link 3 functions as the quantum communication channel and the optical data communication channel functions as the classical communication channel.

By the quantum-key distribution system 100 including such a transmitter 1 and a receiver 2, when an eavesdropper observes a stream of photons transmitted by the transmitter 1 on the optical fiber link 3, the physical state of the photons is changed and the receiver 2 that receives the photons can recognize that the photons have been observed by the eavesdropper.

The transmitter 1 and the receiver 2 are generically referred to as "quantum-key distribution apparatus (QKD apparatus)."

Figure 2:
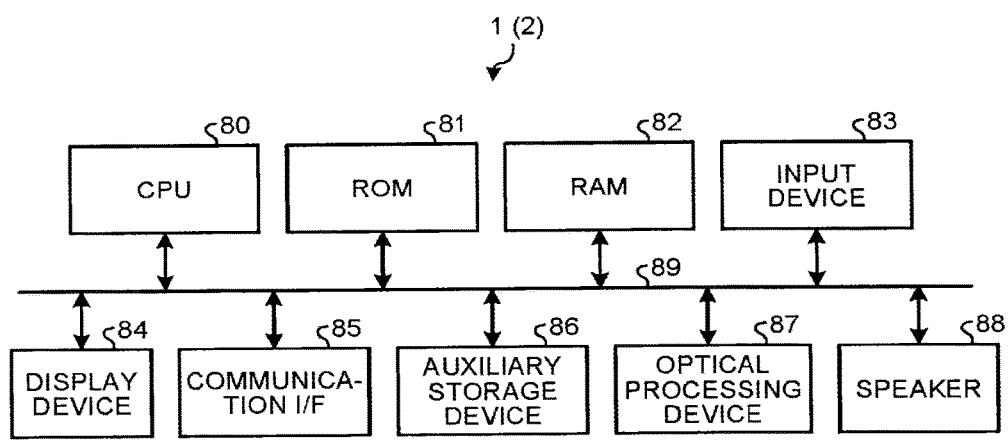
FIG. 2 is a block diagram illustrating one example of the hardware configuration of a QKD apparatus.

FIG. 2 is a block diagram illustrating one example of the hardware configuration of the QKD apparatus in the embodiment. With reference to FIG. 2, the hardware configuration of the QKD apparatus (the transmitter 1, the receiver 2) will be described.

As illustrated in FIG. 2, the QKD apparatus includes a central processing unit (CPU) 80, a read only memory (ROM) 81, a random access memory (RAM) 82, an input device 83, a display device 84, a communication interface (I/F) 85, an auxiliary storage device 86, an optical processing device 87, and a speaker 88.

The CPU 80 is an arithmetic device that controls the operation of a whole of the QKD apparatus. The ROM 81 is a non-volatile storage device that stores therein computer programs the CPU 80 executes to control respective functions. The RAM 82 is a volatile storage device that functions as a work memory of the CPU 80.

The input device 83 is a device such as a mouse and a keyboard with which the selection of characters, numerals, and various instructions is made and the setting of setting information is performed.

The display device 84 is a display device that displays cursors, menus, windows, and a variety of information such as characters or images. The display 84 is a cathode ray tube (CRT) display, a liquid crystal display, a plasma display, or an organic electroluminescence (EL) display, for example. The display device 84 is connected to the body of the QKD apparatus via a VGA cable or a high-definition multimedia interface (HDMI (registered trademark)) cable, for example.

The communication I/F 85 is an interface to perform data communication via a classical communication channel such as a network like a local area network (LAN), or a wireless network. The communication I/F 85 is an interface that supports Ethernet (registered trademark) such as 10 Base-T, 100 Base-TX, or 1000 Base-T, for example.

The auxiliary storage device 86 is a non-volatile storage device that stores and accumulates therein various computer programs executed by the CPU 80, data generated in the process of encryption-key generation operation, and others. The auxiliary storage device 86 is a storage device, such as a hard disk drive (HDD), a solid state drive (SSD), a flash memory, an optical disk, or others, capable of storing electrically, magnetically, or optically computer programs and data.

The optical processing device 87 is an optical device that transmits or receives a stream of photons via a quantum communication channel. The optical processing device 87 of the transmitter 1 transmits a stream of photons composed of single photons, which are generated to be in a polarizing state based on basis information that is generated by randomly selected bases with respect to a bit string (a photon bit string) that is bit information generated by random numbers, to the optical processing device 87 of the receiver 2 via a quantum communication channel (the optical fiber link 3 depicted in FIG. 1), for example. That is, each photon of the stream of photons generated by the optical processing device 87 of the transmitter 1 has one bit information of "0" or "1." While the stream of photons has been described to be composed of single photons that are generated to be in a polarizing state based on the basis information, it is not limited to this, and it may be composed of single photons that are generated so as to be in a phase state based on the basis information. The optical processing device 87 of the receiver 2 acquires the photon bit string that is the bit information by receiving the stream of photons from the optical processing device 87 of the transmitter 1 via the quantum communication channel, and reading the received stream of photons based on basis information generated by randomly selected bases.

The speaker 88 is a device that outputs sound in accordance with the instructions of the CPU 80.

The foregoing CPU 80, the ROM 81, the RAM 82, the input device 83, the display device 84, the communication I/F 85, the auxiliary storage device 86, the optical processing device 87, and the speaker 88 are connected via a bus 89 such as an address bus and a data bus so as to be able to communicate with one another.

The respective devices of the QKD apparatus illustrated in FIG. 2 are one example, and not all devices need to be included. For example, if there is no need to display information, the display device 84 does not necessarily need to be included, and if there is no need to output sound, the speaker 88 does not necessarily need to be included.

Figure 3:
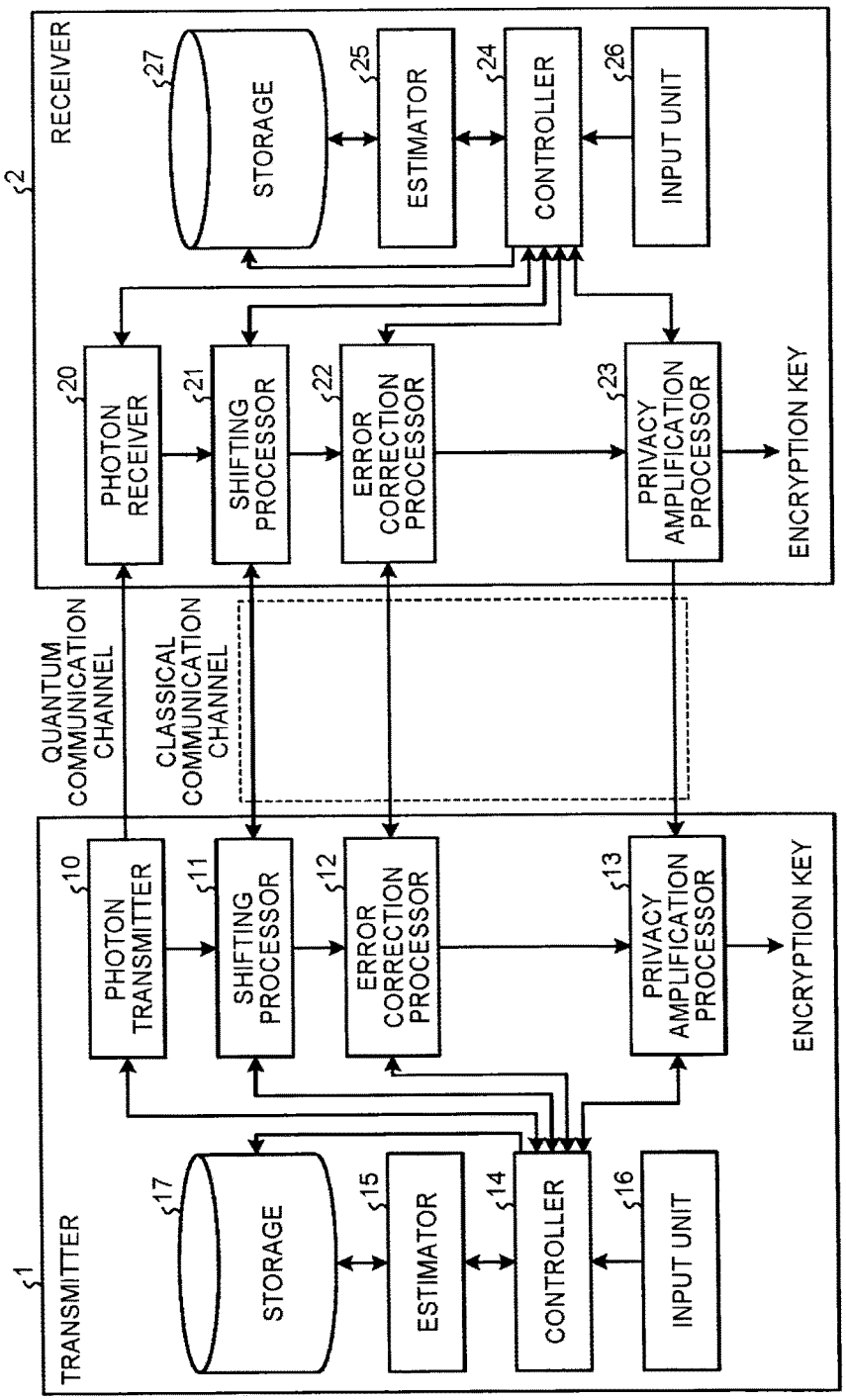
FIG. 3 is a block diagram illustrating one example of the configuration of functional blocks of the QKD apparatus.

FIG. 3 is a block diagram illustrating one example of the configuration of functional blocks of the QKD apparatus in the embodiment. With reference to FIG. 3, the configuration of functional blocks of the QKD apparatus (the transmitter 1, the receiver 2) will be described.

As illustrated in FIG. 3, the transmitter 1 includes a photon transmitter 10 (which may be referred to as a quantum-key sharer), a shifting processor 11 (which may be referred to as a shifter), an error correction processor 12 (which may be referred to as a corrector), a privacy amplification processor 13 (which may be referred to as a privacy amplifier), a controller 14, an estimator 15, an input unit 16, and a storage 17.

The photon transmitter 10 is a functional unit that shares a stream of photons with the photon receiver 20 by transmitting the stream of photons composed of single photons, which are generated to be in a polarizing state based on basis information generated by randomly selected bases with respect to a photon bit string that is bit information generated by random numbers, to a photon receiver 20 of the receiver 2 via a quantum communication channel, for example. The photon transmitter 10 is implemented by the optical processing device 87 illustrated in FIG. 2.

The shifting processor 11 is a functional unit that performs shifting processing that generates a shared bit string by receiving basis information generated by the photon receiver 20 of the receiver 2 from a shifting processor 21 of the receiver 2 via a classical communication channel, comparing the received basis information with basis information generated by the photon transmitter 10, and extracting bits corresponding to a matched portion from the photon bit string. The shifting processor 11 further calculates a sample QBER (one example of a tentative error rate) that is a tentative QBER to estimate what the value of QBER would be like, by using the bit information on a part of the shared bit string. The described shifting processing is one example, and other methods may be employed.

The error correction processor 12 is a functional unit that performs error correction processing that generates a corrected bit string by exchanging control data (error correction (EC) information) with an error correction processor 22 of the receiver 2 via the classical communication channel and correcting bit errors of the shared bit string. When the error correction processing is successful, the corrected bit string generated by the error correction processor 12 agrees with a corrected bit string generated by correcting the shared bit string by the error correction processor 22 of the receiver 2 which will be described later. Because the corrected bit string is the bit string in which bit errors of the shared bit string have been corrected, the shared bit string and the corrected bit string are identical in length.

The error correction processor 12 further calculates the QBER based on the number of error bits corrected in the error correction processing that generates the corrected bit string, and the number of bits in the corrected bit string. Furthermore, the error correction processor 12 calculates, to correct bit errors of the shared bit string and to generate the corrected bit string as in the foregoing, an information leakage amount that is the amount of leaked bit information based on the amount of information on the EC information exchanged with the error correction processor 22. It is indicated that as the number of leaked bits becomes larger, the probability of being eavesdropped becomes higher and the amount of eavesdropped information becomes more probably larger.

The privacy amplification processor 13 is a functional unit that generates encryption keys by receiving control data (privacy amplification (PA) information) from a later-described privacy amplification processor 23 of the receiver 2 via the classical communication channel, and performing, based on the PA information, key compression processing (privacy amplification processing) to negate bits having a probability of being eavesdropped by an eavesdropper on the corrected bit string from the number of errors corrected by the error correction processor 12 at the time of performing the processing in the photon transmitter 10 and the error correction processor 12. When the privacy amplification processing is successful, the encryption keys generated by the privacy amplification processor 13 are to agree with encryption keys generated by the privacy amplification processor 23 of the receiver 2, and thus the identical encryption keys are to be shared. These shared encryption keys are used when encrypted data communication is performed between the transmitter 1 and the receiver 2 or between applications coupled to the respective apparatuses.

The controller 14 is a functional unit that controls the operation of the above-described photon transmitter 10, the shifting processor 11, the error correction processor 12, and the privacy amplification processor 13. Furthermore, the controller 14 acquires measurement values (output values) that are obtained in the respective pieces of processing of the photon transmitter 10, the shifting processor 11, the error correction processor 12, and the privacy amplification processor 13 and transmits them to the estimator 15. The controller 14 stores in advance initial values of operating input from the input unit 16 into the storage 17. The initial values are initial values (examples of given values) corresponding to the measurement values obtained in the respective pieces of processing performed in the photon transmitter 10, the shifting processor 11, the error correction processor 12, and the privacy amplification processor 13. As for the initial values, they only need to be the values defined based on the measurement values of the respective pieces of processing performed in the past, or the values expected from the characteristics, installation environments, methods of QKD, and others of the transmitter 1 and the receiver 2, for example. The measurement value output in the sharing processing performed on a stream of photons (hereinafter, referred to as "photon sharing processing") in the photon transmitter 10 is the number of photons in the stream of photons (hereinafter, simply referred to as "the number of photons"). The measurement value output in the shifting processing of the shifting processor 11 is the above-described sample QBER. The measurement values output in the error correction processing of the error correction processor 12 are the above-described QBER and the information leakage amount. The measurement value output in the private amplification processing of the privacy amplification processor 13 is the processing time it takes until a single encryption key is generated, that is, the processing time necessary from the photon sharing processing to finish the privacy amplification processing.

The estimator 15 is a functional unit that performs estimation operation of a secure key rate. Specifically, the estimator 15 estimates a secure key rate, at the respective timing of the start-up, the photon sharing processing, the shifting processing, the error correction processing, and the privacy amplification processing of the transmitter 1, by using the measurement values that can be acquired and the initial values corresponding to the measurement values that cannot be acquired. At this time, the estimator 15 acquires the initial values used to estimate the secure key rate from the storage 17 in which the initial values are stored in advance. The detail of the estimation operation performed by the estimator 15 will be described later with reference to FIG. 5.

The input unit 16 is a functional unit that receives operating input of initial values and others. The input unit 16 is implemented by the input device 83 illustrated in FIG. 2.

The storage 17 is a functional unit that stores therein the initial values of operating input from the input unit 16. The storage 17 is implemented by the auxiliary storage device 86 illustrated in FIG. 2.

The foregoing shifting processor 11, the error correction processor 12, the privacy amplification processor 13, the controller 14, and the estimator 15 are implemented by the CPU 80 illustrated in FIG. 2 reading out and executing a computer program stored in the auxiliary storage device 86 and others onto the RAM 82. It is not limited that all of the shifting processor 11, the error correction processor 12, the privacy amplification processor 13, the controller 14, and the estimator 15 are to be implemented by the execution of the computer program. At least any one of the foregoing may be implemented by a hardware circuit such as an application specific integrated circuit (ASIC), a field-programmable gate array (FPGA), or other integrated circuits, for example.

The photon transmitter 10, the shifting processor 11, the error correction processor 12, the privacy amplification processor 13, the controller 14, the estimator 15, the input unit 16, and the storage 17 illustrated in FIG. 3 conceptually illustrate the functionality thereof, and are not limited to such a configuration. For example, a plurality of functional units illustrated as independent functional units in FIG. 3 may be configured as a single functional unit. Meanwhile, the function of a single functional unit in FIG. 3 may be divided into a plurality of functions and configured as a plurality of functional units.

As illustrated in FIG. 3, the receiver 2 includes the photon receiver 20 (may be referred to as a quantum-key sharer), the shifting processor 21 (may be referred to as a shifter), the error correction processor 22 (may be referred to as a corrector), the privacy amplification processor 23 (may be referred to as a privacy amplifier), a controller 24, an estimator 25, an input unit 26, and a storage 27.

The photon receiver 20 is a functional unit that acquires a photon bit string that is the bit information by receiving a stream of photons from the photon transmitter 10 of the transmitter 1 via the quantum communication channel, sharing the stream of photons with the photon transmitter 10, and reading the received stream of photons based on basis information generated by randomly selected bases. The photon receiver 20 is implemented by the optical processing device 87 illustrated in FIG. 2.

The shifting processor 21 is a functional unit that performs the shifting processing that generates a shared bit string by receiving basis information generated by the photon transmitter 10 of the transmitter 1 from the shifting processor 11 of the transmitter 1 via a classical communication channel, comparing the received basis information with basis information generated by the photon receiver 20, and extracting bits corresponding to a matched portion from the photon bit string. The shifting processor 21 further calculates a sample QBER that is a tentative QBER to estimate what the value of QBER would be like, by using the bit information on a part of the shared bit string. The described shifting processing is one example, and other methods may be employed.

The error correction processor 22 is a functional unit that performs the error correction processing that generates a corrected bit string by exchanging control data (EC information) with the error correction processor 12 of the transmitter 1 via the classical communication channel and correcting bit errors of the shared bit string. When the error correction processing is successful, the corrected bit string generated by the error correction processor 22 agrees with the corrected bit string that is generated by correcting the shared bit string by the error correction processor 12 of the transmitter 1. Because the corrected bit string is the bit string in which bit errors of the shared bit string have been corrected, the shared bit string and the corrected bit string are identical in length.

The error correction processor 22 further calculates the QBER based on the number of error bits corrected in the error correction processing that generates the corrected bit string, and the number of bits in the corrected bit string. Furthermore, the error correction processor 22 calculates, in order to correct bit errors of the shared bit string and generate the corrected bit string as in the foregoing, an information leakage amount that is the amount of leaked bit information based on the amount of information of the EC information exchanged with the error correction processor 12. It is indicated that as the number of leaked bits becomes larger, the probability of being eavesdropped becomes higher and the amount of eavesdropped information becomes more probably larger.

The privacy amplification processor 23 is a functional unit that generates encryption keys by generating control data (PA information) and transmitting it to the privacy amplification processor 13 of the transmitter 1 via the classical communication channel, and performing, based on the PA information, key compression processing (privacy amplification processing) to negate bits having a probability of being eavesdropped by an eavesdropper on the corrected bit string from the number of errors corrected by the error correction processor 22 at the time of performing the processing in the photon receiver 20 and the error correction processor 22. When the privacy amplification processing is successful, the encryption keys generated by the privacy amplification processor 23 are to agree with the encryption keys generated by the privacy amplification processor 13 of the transmitter 1, and thus the identical encryption keys are to be shared. These shared encryption keys are used when encrypted data communication is performed between the transmitter 1 and the receiver 2 or between applications coupled to the respective apparatuses.

The controller 24 is a functional unit that controls the operation of the above-described photon receiver 20, the shifting processor 21, the error correction processor 22, and the privacy amplification processor 23. Furthermore, the controller 24 acquires measurement values that are obtained in the respective pieces of processing of the photon receiver 20, the shifting processor 21, the error correction processor 22, and the privacy amplification processor 23 and transmits them to the estimator 25. The controller 24 stores in advance the initial values of operating input from the input unit 26 into the storage 27. As for the initial values and the measurement values, the content of the foregoing explanation of the controller 14 is applied.

The estimator 25 is a functional unit that performs the estimation operation of a secure key rate. Specifically, the estimator 25 estimates a secure key rate, at the respective timing of the start-up, the photon sharing processing, the shifting processing, the error correction processing, and the privacy amplification processing of the receiver 2, by using the measurement values that can be acquired and the initial values corresponding to the measurement values that cannot be acquired. At this time, the estimator 25 acquires the initial values used to estimate the secure key rate from the storage 27 in which they are stored in advance. The detail of the estimation operation performed by the estimator 25 will be described later with reference to FIG. 5.

The input unit 26 is a functional unit that receives operating input of initial values and others. The input unit 26 is implemented by the input device 83 illustrated in FIG. 2.

The storage 27 is a functional unit that stores therein the initial values of operating input from the input unit 26. The storage 27 is implemented by the auxiliary storage device 86 illustrated in FIG. 2.

The foregoing shifting processor 21, the error correction processor 22, the privacy amplification processor 23, the controller 24, and the estimator 25 are implemented by the CPU 80 illustrated in FIG. 2 reading out and executing the computer program stored in the auxiliary storage device 86 and others onto the RAM 82. It is not limited that all of the shifting processor 21, the error correction processor 22, the privacy amplification processor 23, the controller 24, and the estimator 25 are implemented by the execution of the computer program. At least any of the foregoing may be implemented by a hardware circuit such as an application specific integrated circuit (ASIC), a field-programmable gate array (FPGA), or other integrated circuits, for example.

The photon receiver 20, the shifting processor 21, the error correction processor 22, the privacy amplification processor 23, the controller 24, the estimator 25, the input unit 26, and the storage 27 illustrated in FIG. 3 are conceptually illustrating the functionality thereof, and are not limited to such a configuration. For example, a plurality of functional units illustrated as independent functional units in FIG. 3 may be configured as a single functional unit. Meanwhile, the function of a single functional unit in FIG. 3 may be divided into a plurality of functions and configured as a plurality of functional units.

FIG. 4 is a sequence diagram illustrating one example of encryption-key generation operation of the QKD apparatus in the embodiment. With reference to FIG. 4, the sequence of the encryption-key generation operation will be described.

Step S11

The photon transmitter 10 transmits a stream of photons composed of single photons, which are generated to be in a polarizing state based on basis information generated by randomly selected bases with respect to a photon bit string that is the bit information generated by random numbers, to the photon receiver 20 of the receiver 2 via a quantum communication channel, and shares the stream of photons with the photon receiver 20, for example. The photon transmitter 10 transmits the generated basis information and the photon bit string to the shifting processor 11. The photon transmitter 10 may be configured to store the generated basis information and the photon bit string into the storage 17.

Step S12

The photon receiver 20 acquires the photon bit string that is the bit information by receiving the stream of photons from the photon transmitter 10 of the transmitter 1 via the quantum communication channel, sharing the stream of photons with the photon transmitter 10, and reading the received stream of photons based on the basis information generated by the randomly selected bases. The photon receiver 20 transmits the generated basis information and the photon bit string to the shifting processor 21. The photon receiver 20 may be configured to store the generated basis information and the photon bit string into the storage 27.

Step S13

The shifting processor 11 performs the shifting processing that generates a shared bit string by receiving the basis information generated by the photon receiver 20 of the receiver 2 from the shifting processor 21 of the receiver 2 via the classical communication channel, comparing the received basis information with the basis information generated by the photon transmitter 10, and extracting bits corresponding to a matched portion from the photon bit string. The shifting processor 11 transmits the generated shared bit string to the error correction processor 12. The shifting processor 11 may be configured to store the generated shared bit string into the storage 17.

Step S14

The shifting processor 21 performs the shifting processing that generates a shared bit string by receiving the basis information generated by the photon transmitter 10 of the transmitter 1 from the shifting processor 11 of the transmitter 1 via the classical communication channel, comparing the received basis information with the basis information generated by the photon receiver 20, and extracting bits corresponding to a matched portion from the photon bit string. The shifting processor 21 transmits the generated shared bit string to the error correction processor 22. The shifting processor 21 may be configured to store the generated shared bit string into the storage 27.

Step S15

The error correction processor 12 performs the error correction processing that generates a corrected bit string by exchanging control data (EC information) with the error correction processor 22 of the receiver 2 via the classical communication channel and correcting bit errors of the shared bit string generated by the shifting processor 11. The error correction processor 12 transmits the generated corrected bit string to the privacy amplification processor 13. The error correction processor 12 may be configured to store the generated corrected bit string into the storage 17.

Step S16

The error correction processor 22 performs the error correction processing that generates a corrected bit string by exchanging control data (EC information) with the error correction processor 12 of the transmitter 1 via the classical communication channel and correcting bit errors of the shared bit string generated by the shifting processor 21. The error correction processor 22 transmits the generated corrected bit string to the privacy amplification processor 23. The error correction processor 22 may be configured to store the generated corrected bit string into the storage 27.

Step S17

The privacy amplification processor 13 generates an encryption key by receiving control data (PA information) from the privacy amplification processor 23 of the receiver 2 via the classical communication channel and performing, based on the PA information, the key compression processing (privacy amplification processing) to negate bits having a probability of being eavesdropped by an eavesdropper on the corrected bit string, which has been generated by the error correction processor 12, from the number of errors corrected by the error correction processor 12 at the time of performing the processing in the photon transmitter 10 and the error correction processor 12. The privacy amplification processor 13 stores (accumulates) the generated encryption key into the storage 17.

Step S18

The privacy amplification processor 23 generates an encryption key by generating control data (PA information) and transmitting it to the privacy amplification processor 13 of the transmitter 1 via the classical communication channel and performing, based on the PA information, the key compression processing (privacy amplification processing) to negate bits having a probability of being eavesdropped by an eavesdropper on the corrected bit string, which has been generated by the error correction processor 22, from the number of errors corrected by the error correction processor 22 at the time of performing the processing in the photon receiver 20 and the error correction processor 22. The privacy amplification processor 23 stores (accumulates) the generated encryption key into the storage 27.

By the above-described operation, in the transmitter 1 and the receiver 2, the identical encryption keys are generated. Because the encryption key generated by the foregoing operation is what is called a one-time pad, different encryption keys are repeatedly generated by the foregoing operation. The foregoing operation is not limited to the generation of encryption keys by a one-time pad method, and it may be applied to the generation of encryption keys by other methods, for example, a common key encryption method typified by the advanced encryption standard (AES).

While the functional units in FIG. 3 each transmit the generated bit string thereof to the functional unit of the subsequent process directly, they may be configured to go through the storage 17 or the storage 27. For example, in the foregoing, the shifting processor 11 is to transmit the generated shared bit string to the error correction processor 12 directly. Alternatively, the shifting processor 11 may be configured to store the shared bit string into the storage 17, and the error correction processor 12 may be configured to read out the shared bit string from the storage 17 and perform the error correction processing.

Figure 6:
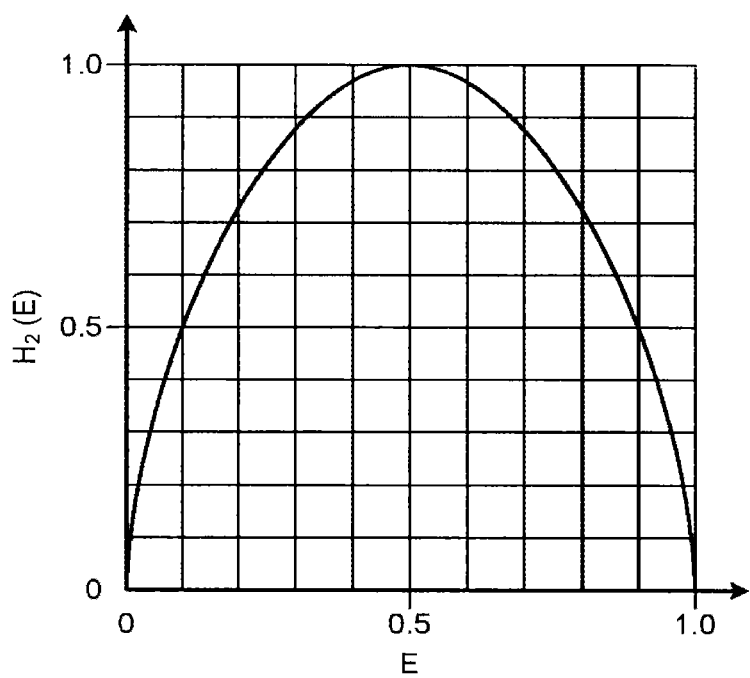
FIG. 6 is a graphic chart illustrating a binary entropy function.

FIG. 5 is a table illustrating information for obtaining estimated values in the respective pieces of processing. FIG. 6 is a graphic chart illustrating a binary entropy function. With reference to FIGS. 5 and 6, the estimation operation of a secure key rate and the operation of adjustments in the respective pieces of processing in encryption-key generation operation will be described.

As illustrated in FIG. 5, the encryption-key generation operation is performed in the order of (1) apparatus start-up, (2) photon sharing processing, (3) shifting processing, (4) error correction processing, and (5) privacy amplification processing. The outlines of the operation of the respective pieces of processing (2) to (5) are as discussed above with reference to FIG. 4.

The lengths of the encryption keys generated by the privacy amplification processors 13 and 23 can be calculated based on the number of photons in the stream of photons shared by the photon sharing processing of the photon transmitter 10 and photon receiver 20 and on the QBER and the information leakage amount calculated by the error correction processing of the error correction processors 12 and 22. The length $R_{secure}$ of an encryption key for which the safety in encryption communication is proven by information theory is expressed by the following Expression 1:

$$R_{secure} = \tfrac{1}{2} Q \{1 - (1 + f_{EC}(E)) * H_2(E)\} \qquad (1)$$

$R_{secure}$: Length of encryption key
E: QBER (Error rate in quantum communication channel)
Q: Number of shared photons
½: Remaining ratio by shifting processing out of number of shared photons
$f_{EC}(E)$: EC efficiency
$H_2(E)$: Binary entropy function The EC efficiency $f_{EC}$ in Expression 1 is a ratio of how much amount of information is leaked to an eavesdropper due to performing error correction on a given bit string and is a value dependent on the QBER and the information leakage amount. The $H_2(E)$ is a binary entropy function that is the function of an error rate E as illustrated in FIG. 6. As just described, the length $R_{secure}$ of the encryption key is obtainable by the number of shared photons, the QBER, and the information leakage amount, and thus, where $R_{secure}$=f (the number of shared photons, QBER, information leakage amount), by using this function f and the processing time that is obtained when the privacy amplification processing of the privacy amplification processors 13 and 23 is finished, the secure key rate can be obtained by the following Expression 2:

(Secure key rate)=f(the number of shared photons, QBER, information leakage amount)/(processing time) (2)

As for this secure key rate, as expressed in the foregoing Expression 1 and Expression 2, an accurate value is not obtainable unless the number of shared photons, the QBER, the information leakage amount, and the processing time have been measured. The number of shared photons, the QBER, the information leakage amount, and the processing time are all presented as measurement values when the privacy amplification processing of the privacy amplification processors 13 and 23, which is the phase (5) in the foregoing, is finished. To improve the secure key rate, if an expected secure key rate is obtained at the foregoing phases (1) to (4), the adjustment operation of the photon sharing processing, the shifting processing, and the error correction processing is easy. At the phase (5), an accurate secure key rate is obtained, and thus the adjustment operation of the privacy amplification processing is easy. With reference to FIG. 5, the following describes the estimation operation of a secure key rate performed by the estimators 15 and 25 at the respective phases (1) to (5) in the foregoing. While the estimator 15 is exemplified here, the estimator 25 operates in the same manner.

At the time of (1) apparatus start-up in FIG. 5, none of the number of shared photons, the QBER, the information leakage amount, and the processing time are measured, and thus the estimator 15 acquires the initial values of the number of shared photons, the QBER, the information leakage amount, and the processing time that are stored in the storage 17. The estimator 15 then, by using the initial values of the number of shared photons, the QBER, the information leakage amount, and the processing time as illustrated in FIG. 5, calculates an estimated value of secure key rate by Expression 1 and Expression 2. The estimated value of secure key rate calculated here by the estimator 15 is calculated by using initial values on all of the number of shared photons, the QBER, the information leakage amount, and the processing time, and thus the value is referred to as an initial value of secure key rate. As in the foregoing, the initial values of the number of shared photons, the QBER, the information leakage amount, and the processing time are defined as the values calculated based on the measurement values of the respective pieces of processing in the past, and thus the initial value of secure key rate can be considered to be an ideal value of secure key rate that is expected from the characteristics of the QKD apparatus (the transmitter 1, here), the installation environment of the QKD apparatus, the method of QKD, and others. The estimator 15 stores the calculated initial value of secure key rate into the storage 17. As the ideal value of secure key rate, an estimated value of secure key rate when the values expected from the apparatus characteristics and others are set as the respective initial values of the number of shared photons, the QBER, the information leakage amount, and the processing time, that is, the value of secure key rate expected from the apparatus characteristics and others, may be employed. As the ideal value of secure key rate, an estimated value of secure key rate when the optimal or preferable values out of the respective measurement values of the number of shared photons, the QBER, the information leakage amount, and the processing time in the past are used, that is, the actual value of optimal or preferable secure key rate in the past, may be employed.

At the time of performing (2) photon sharing processing in FIG. 5, the QBER, the information leakage amount, and the processing time are not yet measured, and thus the estimator 15 acquires the respective initial values of the QBER, the information leakage amount, and the processing time that are stored in the storage 17. The estimator 15 further receives the measurement value of the number of shared photons that is output by the photon sharing processing of the photon transmitter 10 via the controller 14. The estimator 15 then, by using the measurement value of the number of shared photons and using the initial values of the QBER, the information leakage amount, and the processing time as illustrated in FIG. 5, calculates an estimated value of secure key rate by Expression 1 and Expression 2. The controller 14 further adjusts the operation of the photon sharing processing performed by the photon transmitter 10 based on the difference between the initial value of secure key rate stored in the storage 17 and the estimated value of secure key rate calculated by the estimator 15. For example, the controller 14 makes adjustments so as to increase the number of shared photons by the photon sharing processing. That is, at the phase before performing the shifting processing, that is, at the phase of having performed only the photon sharing processing, when a sufficient secure key rate has not been obtained from the estimated value of the estimator 15, the controller 14 can expect an improvement effect in secure key rate by making adjustments only in the operation of the photon sharing processing of the photon transmitter 10. The adjustments made by the controller 14 in the operation of the photon sharing processing may be performed automatically based on the difference between the initial value of secure key rate and the estimated value of secure key rate, or may be performed based on the operating input of an operator received by the input unit 16. The operation of being adjusted based on the operating input of the operator received by the input unit 16 will be described in detail in a later-described first modification.

At the time of performing (3) shifting processing in FIG. 5, the QBER, the information leakage amount, and the processing time are not yet measured. However, the shifting processor 11 calculates, as in the foregoing, a sample QBER that is a tentative QBER by the shifting processing. Consequently, the estimator 15 uses, as the QBER in Expression 1 and Expression 2, the sample QBER calculated by the shifting processor 11 as a measurement value of QBER. The estimator 15 acquires the respective initial values of the information leakage amount and the processing time that are stored in the storage 17. The estimator 15 further receives, via the controller 14, the measurement values of the number of shared photons output by the photon sharing processing of the photon transmitter 10, and the sample QBER output by the shifting processing of the shifting processor 11. The estimator 15 then, by using the measurement values of the number of shared photons and the sample QBER and using the initial values of the information leakage amount and the processing time as illustrated in FIG. 5, calculates an estimate value of secure key rate by Expression 1 and Expression 2. The controller 14 further adjusts the operation of the shifting processing performed by the photon transmitter 10 based on the difference between the initial value of secure key rate stored in the storage 17 and the estimated value of secure key rate calculated by the estimator 15. That is, at the phase of performing the photon sharing processing and the shifting processing, when a sufficient secure key rate has not been obtained from the estimated value of the estimator 15, the controller 14 can expect an improvement effect in secure key rate by making adjustments only in the operation of the shifting processing of the shifting processor 11 because the adjustments in the photon sharing processing have already been finished. The adjustments made by the controller 14 in the operation of the shifting processing may be performed automatically based on the difference between the initial value of secure key rate and the estimated value of secure key rate, or may be performed based on the operating input of the operator received by the input unit 16. The operation of being adjusted based on the operating input of the operator received by the input unit 16 will be described in detail in the later-described first modification.

At the time of performing (4) error correction processing in FIG. 5, only the processing time is not yet measured, and thus the estimator 15 acquires the initial value of the processing time stored in the storage 17. The estimator 15 further receives, via the controller 14, the measurement values of the number of shared photons output by the photon sharing processing of the photon transmitter 10 and the QBER and the information leakage amount output by the error correction processing of the error correction processor 12. The estimator 15 then, by using the measurement values of the number of shared photons, the QBER, and the information leakage amount and using the initial value of the processing time as illustrated in FIG. 5, calculates an estimate value of secure key rate by Expression 1 and Expression 2. For example, it is assumed that the initial value of QBER stored in the storage 17 is 5% and the estimated value of secure key rate by the estimator 15 at the phase of (1) apparatus start-up is 100 kbps. At the subsequent execution phase of the error correction processing by the error correction processor 12, when the QBER is figured out at 6% by the error correction processor 12, the estimator 15 uses, instead of 5% that is the initial value of QBER, 6% that is the calculated measurement value, so as to calculate an estimated value of secure key rate. From Expression 1 and Expression 2, the change in QBER from 5% to 6% has a reducing effect on the secure key rate by 24%, and thus the secure key rate is estimated to be 76 kbps by the estimator 15. In this example, the EC efficiency is assumed to be 1.2 for simplicity.

The controller 14 further adjusts the operation of the error correction processing performed by the photon transmitter 10 based on the difference between the initial value of secure key rate stored in the storage 17 and the estimated value of secure key rate calculated by the estimator 15. That is, at the phase of performing the photon sharing processing, the shifting processing, and the error correction processing, when a sufficient secure key rate has not been obtained from the estimated value of the estimator 15, the controller 14 can expect an improvement effect in secure key rate by making adjustments only in the operation of the error correction processing of the error correction processor 12 because the adjustments in the photon sharing processing and the shifting processing have already been finished. For example, as a result of adjustments in the error correction processing by the controller 14, the QBER calculated in the error correction processing by the error correction processor 12 can obtain, from the sample value of 6%, a value of 4% that is accurate as the QBER. Based on this obtained value, a more accurate value as the secure key rate can be obtained from Expression 1 and Expression 2, and thus the secure key rate is estimated to be 127 kbps by the estimator 15.

The adjustments made by the controller 14 in the operation of the error correction processing may be performed automatically based on the difference between the initial value of secure key rate and the estimated value of secure key rate, or may be performed based on the operating input of the operator received by the input unit 16. The operation of being adjusted based on the operating input of the operator received by the input unit 16 will be described in detail in the later-described first modification.

At the time of performing (5) privacy amplification processing in FIG. 5, the number of shared photons, the QBER, the information leakage amount, and the processing time have all been measured. Consequently, the estimator 15 receives, via the controller 14, the measurement values of the number of shared photons output by the photon sharing processing of the photon transmitter 10, the QBER and the information leakage amount output by the error correction processing of the error correction processor 12, and the processing time output by the privacy amplification processing of the privacy amplification processor 13. The estimator 15 then, as illustrated in FIG. 5, calculates an estimated value of secure key rate by Expression 1 and Expression 2 by using the measurement values of the number of shared photons, the QBER, the information leakage amount, and the processing time. As for the estimated value of secure key rate calculated by the estimator 15, it has been calculated all by using the measurement values, and thus it is the actual value of secure key rate. The controller 14 further adjusts the operation of the privacy amplification processing performed by the photon transmitter 10 based on the difference between the initial value of secure key rate stored in the storage 17 and the estimated value of secure key rate calculated by the estimator 15. That is, at the phase of performing the photon sharing processing, the shifting processing, the error correction processing, and the privacy amplification processing, when a sufficient secure key rate has not been obtained from the estimated value of the estimator 15, the controller 14 can expect an improvement effect in secure key rate by making adjustments only in the operation of the privacy amplification processing of the error correction processor 12 because the adjustments in the photon sharing processing, the shifting processing, and the error correction processing have already been finished. The adjustments made by the controller 14 in the operation of the privacy amplification processing may be performed automatically based on the difference between the initial value of secure key rate and the estimated value of secure key rate, or may be performed based on the operating input of the operator received by the input unit 16. The operation of being adjusted based on the operating input of the operator received by the input unit 16 will be described in detail in the later-described first modification.

As in the foregoing, at the respective phases of the photon sharing processing, the shifting processing, the error correction processing, and the privacy amplification processing in the encryption-key generation operation, the secure key rate is estimated by using, out of the parameters for calculating the secure key rate, the measurement values for the parameters that have been measured and the initial values for the parameters that have not been measured. Consequently, the estimated value of secure key rate can be recognized at the respective phases in the encryption-key generation operation, and by adjusting the processing that is operating at the respective phases, the secure key rate can be made closer to the ideal value, and thus the secure key rate can be improved easily.

While the estimator 15 (25) is to receive the respective measurement values (the number of shared photons, the sample QBER, the QBER, the information leakage amount, and the processing time) in the photon sharing processing, the shifting processing, the error correction processing, and the privacy amplification processing via the controller 14 (24) as in the foregoing, it is not limited to this and it may be configured to receive them directly without the controller 14 (24) intervening.

Furthermore, the computational expression of the above-described Expression 1 used for the estimation of secure key rate can be modified according to the method of QKD. For example, the photon transmitter 10 and the photon receiver 20 are to select the basis at random. However, in the case of a method having a bias in the selection probability of basis, the number of bits discarded in the shifting processing is changed, and thus it only needs to modify also the computational expression of Expression 1, for example. In this case, it only needs to modify the coefficient "½" in Expression 1 corresponding to the bias in the selection probability of bases.

While both the transmitter 1 and the receiver 2 are to include the estimator (the estimator 15, 25) as illustrated in FIG. 3 in the foregoing, they are not limited to this, and either the transmitter 1 or the receiver 2 may be configured to include the estimator.

The estimation operation by the estimators 15 and 25 may be performed each time a measurement value obtainable at the respective pieces of processing is updated, or may be performed at a given time interval.

First Modification

A QKD apparatus according to the first modification will be described with a focus on the difference from the QKD apparatus (the transmitter 1 and the receiver 2) in the above-described embodiment. The QKD apparatus in the first modification further includes a display, in addition to the respective functional units included in the QKD apparatus in the embodiment.

Figure 7:
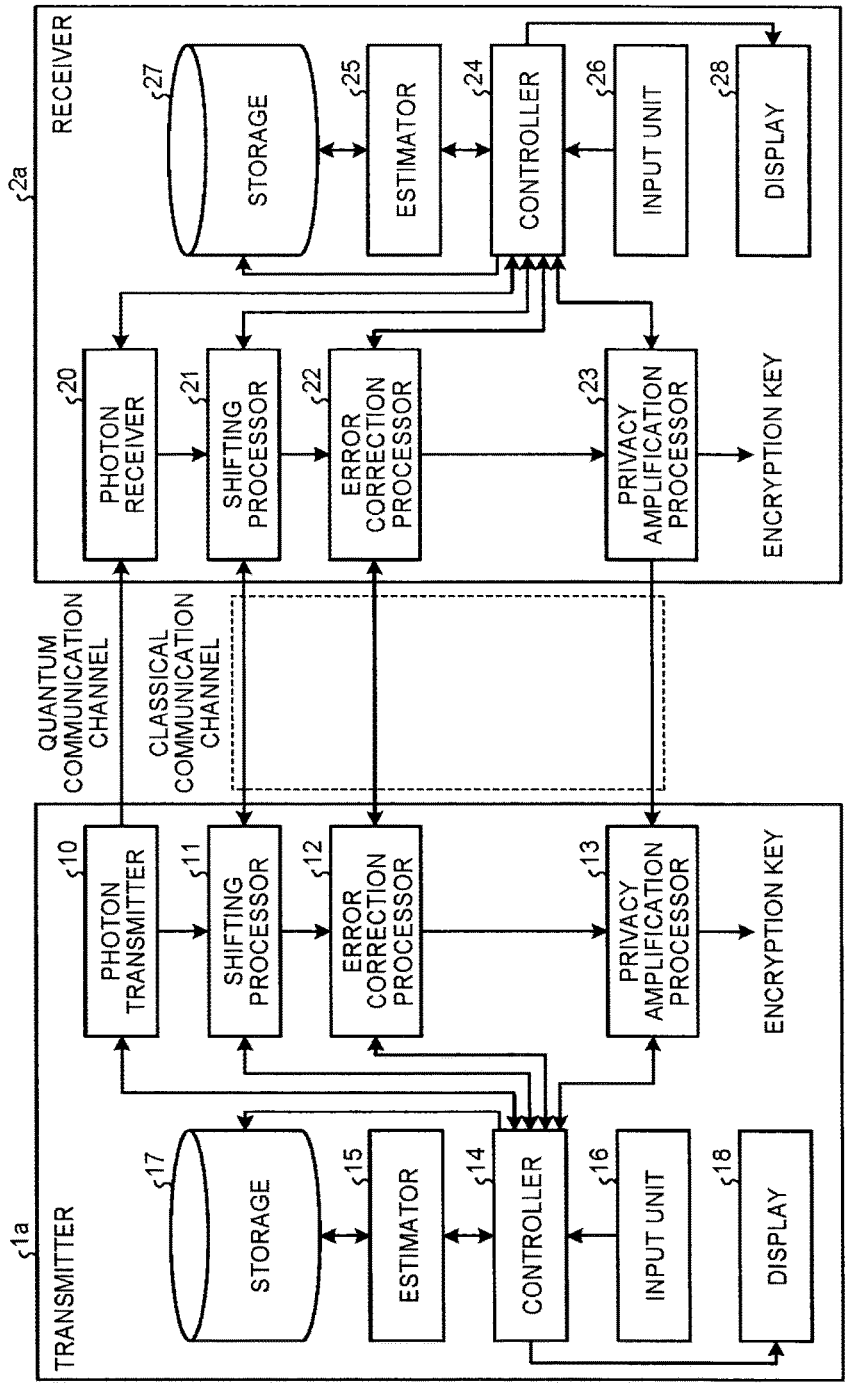
FIG. 7 is a block diagram illustrating one example of the configuration of functional blocks of a QKD apparatus according to a first modification.

FIG. 7 is a block diagram illustrating one example of the configuration of functional blocks of the QKD apparatus in the first modification. With reference to FIG. 7, the configuration of functional blocks of the QKD apparatus (a transmitter 1a, a receiver 2a) in the first modification will be described.

As illustrated in FIG. 7, the transmitter 1a includes the photon transmitter 10 (which may be referred to as a quantum-key sharer), the shifting processor 11 (which may be referred to as a shifter), the error correction processor 12 (which may be referred to as a corrector), the privacy amplification processor 13 (which may be referred to as a privacy amplifier), the controller 14, the estimator 15, the input unit 16, the storage 17, and a display 18.

The controller 14 is a functional unit that controls the operation of the above-described photon transmitter 10, the shifting processor 11, the error correction processor 12, and the privacy amplification processor 13. Furthermore, the controller 14 acquires measurement values that are obtained in the respective pieces of processing of the photon transmitter 10, the shifting processor 11, the error correction processor 12, and the privacy amplification processor 13 and transmits them to the estimator 15. The controller 14 stores in advance initial values of operating input from the input unit 16 into the storage 17. The controller 14 performs, based on the operating input received by the input unit 16, the operation of advancing the respective phases of (1) to (5) in the foregoing, and the adjustment operation of the respective pieces of processing of the photon transmitter 10, the shifting processor 11, the error correction processor 12, and the privacy amplification processor 13.

The input unit 16 is a functional unit that receives the operating input of initial values, the operating input of advancing the respective phases of (1) to (5) in the foregoing, and the operating input to cause the controller 14 to perform the adjustment operation of the respective pieces of processing of the photon transmitter 10, the shifting processor 11, the error correction processor 12, and the privacy amplification processor 13.

The display 18 is a device that displays information concerning the estimated value of secure key rate calculated by the estimator 15. The display 18 is implemented by the display device 84 illustrated in FIG. 2.

As illustrated in FIG. 7, the receiver 2a includes the photon transmitter 20 (which may be referred to as a quantum-key sharer), the shifting processor 21 (which may be referred to as a shifter), the error correction processor 22 (which may be referred to as a corrector), the privacy amplification processor 23 (which may be referred to as a privacy amplifier), the controller 24, the estimator 25, the input unit 26, the storage 27, and a display 28.

The controller 24 is a functional unit that controls the operation of the above-described photon receiver 20, the shifting processor 21, the error correction processor 22, and the privacy amplification processor 23. Furthermore, the controller 24 acquires measurement values that are obtained in the respective pieces of processing of the photon receiver 20, the shifting processor 21, the error correction processor 22, and the privacy amplification processor 23 and transmits them to the estimator 25. The controller 24 stores in advance the initial values of operating input from the input unit 26 into the storage 27. The controller 24 performs, based on the operating input received by the input unit 26, the operation of advancing the respective phases of (1) to (5) in the foregoing, and the adjustment operation of the respective pieces of processing of the photon receiver 20, the shifting processor 21, the error correction processor 22, and the privacy amplification processor 23.

Figure 8:
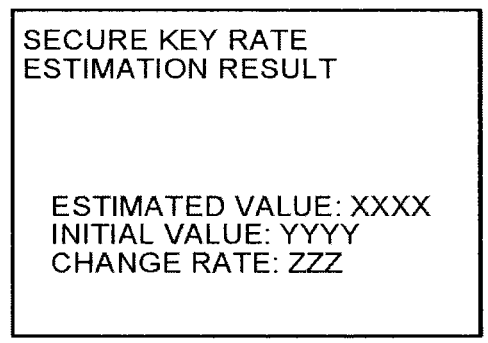
FIG. 8 is a diagram illustrating a display example of an estimated value.
Figure 9:
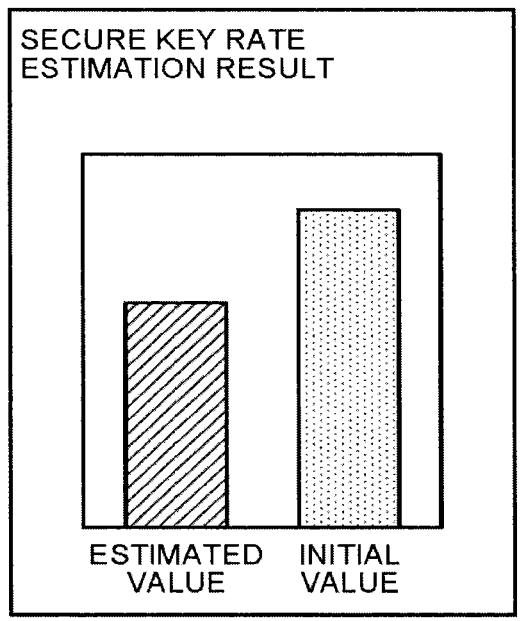
FIG. 9 is a diagram illustrating a display example of the estimated value by a bar chart.
Figure 10:
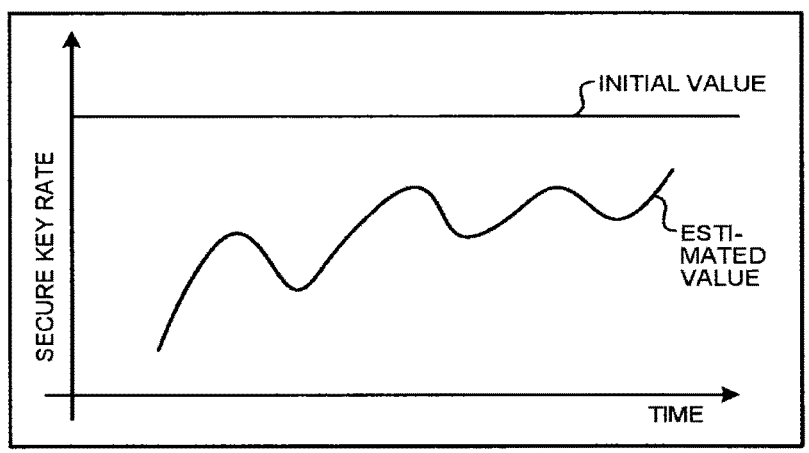
FIG. 10 is a graphic chart illustrating a display example of the estimated value by a time-series chart.
Figure 11:
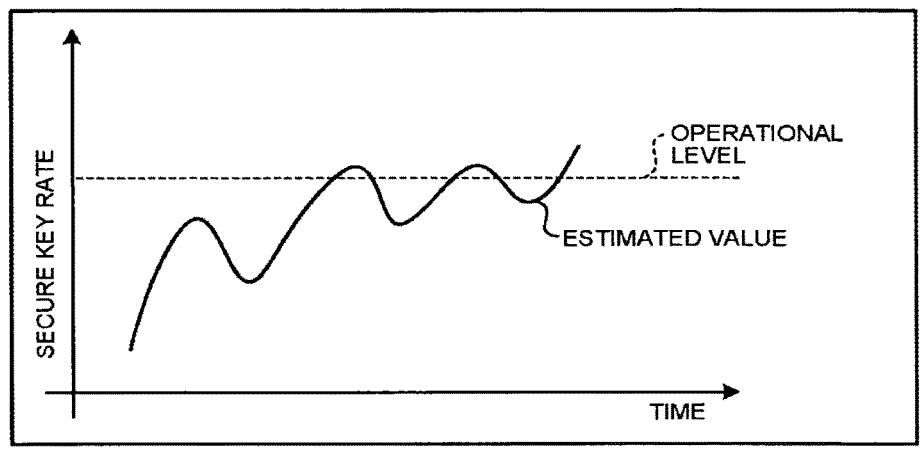
FIG. 11 is a graphic chart illustrating a display example of the estimated value by a time-series chart.

FIG. 8 is a diagram illustrating a display example of an estimated value. FIG. 9 is a diagram illustrating a display example of the estimate value by a bar chart. FIG. 10 is a graphic chart illustrating a display example of the estimated value by a time-series chart. FIG. 11 is a graphic chart illustrating a display example of the estimated value by a time-series chart. With reference to FIGS. 8 to 11 and FIG. 5 in the foregoing, the estimation operation of secure key rate, the operation of displaying the information concerning the estimated value, and the operation of adjusting the respective pieces of processing in the encryption-key generation operation will be described.

The operator who performs the operation to improve secure key rate starts up the QKD apparatus (the transmitter 1 and the receiver 2). The estimation operation of secure key rate by the estimator 15 at the time of (1) apparatus start-up in FIG. 5 is as discussed above. The controller 14 receives the estimated value of secure key rate from the estimator 15 and, as illustrated in FIG. 8, displays the received estimated value and the initial value of secure key rate on the display 18, for example. However, the estimated value and the initial value of secure key rate here are of identical values. The operator then performs, on the input unit 16, the operating input of advancing to the phase of causing the photon transmitter 10 to perform the photon sharing processing that is the subsequent phase.

Upon receiving the operating information to cause the photon transmitter 10 to perform the photon sharing processing from the input unit 16, the controller 14 causes the photon transmitter 10 to start the photon sharing processing. The estimation operation of secure key rate by the estimator 15 at the time of performing (2) photon sharing processing in FIG. 5 is as discussed above. The photon transmitter 10 stores (accumulates) the generated photon bit string into the storage 17. The estimator 15 stores the calculated estimated value of secure key rate into the storage 17. The estimator 15 stores the calculated estimated value of secure key rate into the storage 17. The controller 14 receives the estimated value of secure key rate from the estimator 15 and, as illustrated in FIG. 8, displays the received estimated value and the initial value of secure key rate on the display 18, for example. The operator checks the estimated value and the initial value of secure key rate displayed on the display 18 and, when the operator determines that a sufficient secure key rate is not yet obtained at the phase of performing the photon sharing processing alone from the estimated value of the estimator 15, performs input operation to adjust the photon sharing processing of the photon transmitter 10 on the input unit 16. The controller 14 adjusts, based on the operating input for adjustments received by the input unit 16, the operation of the photon sharing processing by the photon transmitter 10. Consequently, by the adjustments being performed only in the operation of the photon sharing processing of the photon transmitter 10, an improvement effect in secure key rate can be expected. The operator then performs, on the input unit 16, the input operation of advancing to the phase of causing the shifting processor 11 to perform the shifting processing that is the subsequent phase, after adjusting the operation of the photon sharing processing.

Upon receiving the operating information to cause the shifting processor 11 to perform the shifting processing from the input unit 16, the controller 14 causes the shifting processor 11 to start the shifting processing. The shifting processor 11 performs the shifting processing by using the photon bit string accumulated in the storage 17. The estimation operation of secure key rate by the estimator 15 at the time of performing (3) shifting processing in FIG. 5 is as discussed above. The shifting processor 11 stores (accumulates) the generated shared bit string into the storage 17. The estimator 15 stores the calculated estimated value of secure key rate into the storage 17. The controller 14 receives the estimated value of secure key rate from the estimator 15 and, as illustrated in FIG. 8, displays the received estimated value and the initial value of secure key rate on the display 18, for example. The operator checks the estimated value and the initial value of secure key rate displayed on the display 18 and, when the operator determines that a sufficient secure key rate is not yet obtained at the phase of performing the photon sharing processing and the shifting processing from the estimated value of the estimator 15, the operator performs input operation to adjust the shifting processing of the shifting processor 11 on the input unit 16 because the adjustments in the photon sharing processing have already been finished. The controller 14 adjusts, based on the operating input for adjustments received by the input unit 16, the operation of the shifting processing by the shifting processor 11. Consequently, by the adjustments being performed only in the operation of the shifting processing of the shifting processor 11, an improvement effect in secure key rate can be expected. The operator then performs, on the input unit 16, the input operation of advancing to the phase of causing the error correction processor 12 to perform the error correction processing that is the subsequent phase, after adjusting the operation of the shifting processing.

Upon receiving the operating information to cause the error correction processor 12 to perform the error correction processing from the input unit 16, the controller 14 causes the error correction processor 12 to start the error correction processing. The error correction processor 12 performs the error correction processing by using the shared bit string accumulated in the storage 17. The estimation operation of secure key rate by the estimator 15 at the time of performing (4) error correction processing in FIG. 5 is as discussed above. The error correction processor 12 stores (accumulates) the generated corrected bit string into the storage 17. The estimator 15 stores the calculated estimated value of secure key rate into the storage 17. The controller 14 receives the estimated value of secure key rate from the estimator 15 and, as illustrated in FIG. 8, displays the received estimated value and the initial value of secure key rate on the display 18, for example. The operator checks the estimated value and the initial value of secure key rate displayed on the display 18 and, when the operator determines that a sufficient secure key rate is not yet obtained at the phase of performing the photon sharing processing, the shifting processing, and the error correction processing from the estimated value of the estimator 15, the operator performs input operation to adjust the error correction processing of the error correction processor 12 on the input unit 16 because the adjustments in the photon sharing processing and the shifting processing have already been finished. The controller 14 adjusts the operation of the error correction processing by the error correction processor 12 based on the operating input for adjustments received by the input unit 16. Consequently, by the adjustments being performed only in the operation of the error correction processing of the error correction processor 12, an improvement effect in secure key rate can be expected. The operator then performs, on the input unit 16, the input operation of advancing to the phase of causing the privacy amplification processor 13 to perform the privacy amplification processing that is the subsequent phase, after adjusting the operation of the error correction processing.

Upon receiving the operating information to cause the privacy amplification processor 13 to perform the privacy amplification processing from the input unit 16, the controller 14 causes the privacy amplification processor 13 to start the privacy amplification processing. The privacy amplification processor 13 performs the privacy amplification processing by using the corrected bit string accumulated in the storage 17. The estimation operation of secure key rate by the estimator 15 at the time of performing (5) privacy amplification processing in FIG. 5 is as discussed above. The privacy amplification processor 13 stores (accumulates) the generated encryption key into the storage 17. The estimator 15 stores the calculated estimated value of secure key rate into the storage 17. The controller 14 receives the estimated value of secure key rate (the actual value of secure key rate) from the estimator 15 and, as illustrated in FIG. 8, displays the received estimated value and the initial value of secure key rate on the display 18, for example. The operator checks the estimated value and the initial value of secure key rate displayed on the display 18 and, when the operator determines that a sufficient secure key rate is not yet obtained at the phase of performing the photon sharing processing, the shifting processing, the error correction processing, and the privacy amplification processing from the estimated value of the estimator 15, the operator performs input operation to adjust the privacy amplification processing of the privacy amplification processor 13 on the input unit 16 because the adjustments in the photon sharing processing, the shifting processing, and the privacy amplification processing have already been finished. The controller 14 adjusts the operation of the privacy amplification processing by the privacy amplification processor 13 based on the operating input for adjustments received by the input unit 16. Consequently, by the adjustments being performed only in the operation of the privacy amplification processing of the privacy amplification processor 13, an improvement effect in secure key rate can be expected.

By the foregoing procedure, the operator performs the adjustment operation to improve the secure key rate while comparing the estimated value calculated at the respective phases with the initial value.

As in the foregoing, the operator can perform, at the respective phases of (1) to (5) in the foregoing, the adjustment operation of the processing at the respective phases while comparing the estimated value of secure key rate calculated by the estimator 15 (25) with the ideal value (for example, an initial value) of secure key rate. Consequently, because the estimated value that is calculated by the estimator 15 (25) and the initial value are displayed on the display 18 (28), the operator can easily perform the adjustment operation to improve the secure key rate, and thus the secure key rate can be improved easily.

As illustrated in FIG. 8, displayed on the display 18 (28) may be a change rate between the estimated value currently displayed on the display 18 (28) and the estimated value calculated by the estimator 15 (25) at the previous time. In this case, it only needs to configure the estimator 15 (25) so as to calculate the estimated value of secure key rate and calculate the change rate along with it by acquiring the previous estimated value stored in the storage 17 (27), and to configure the controller 14 (24) so as to display the latest estimated value and the change rate calculated by the estimator 15 (25) on the display 18 (28) as illustrated in FIG. 8. By displaying the change rate in this way, the change rate between the estimated value before adjustments and the estimated value after adjustments can be grasped and can serve as a target in the adjustments.

Furthermore, as illustrated in FIG. 8, the display 18 (28) is to display the estimated value calculated by the estimator 15 (25) together with the initial value of secure key rate. However, it is not limited to this, and the display 18 (28) may be configured not to display the initial value of secure key rate. In this case, the operator is to understand the ideal value of secure key rate in advance, and the operator only needs to perform the adjustment operation for the respective pieces of processing such that the estimated value displayed on the display 18 (28) comes closer to the ideal value.

As illustrated in FIG. 9, the display 18 (28) may be configured to display, by a bar chart, the estimated value of secure key rate and the initial value received from the controller 14 (24). Consequently, the operator can visually recognize the difference between the estimated value of secure key rate and the initial value instantaneously.

As illustrated in FIG. 10, the display 18 (28) may be configured to display a graphic chart in which the estimated value is plotted in the time series. In this case, together with the graphic chart, by displaying the line of the initial value of secure key rate, the operator can visually recognize the target of adjustments in the secure key rate and can perceive the effect of adjustment operation on the secure key rate at the respective phases of (1) to (5) in the foregoing.

As illustrated in FIG. 11, the display 18 (28) may be configured to display a line indicative of an operational level together with the graphic chart in which the estimated value is plotted in the time series. The operational level means a secure key rate at which encryption keys that enable encrypted data communication at certain quality to be performed can be generated, for example. With this operational level also, the operator can visually recognize the target of adjustments in the secure key rate and can perceive the effect of adjustment operation on the secure key rate at the respective phases of (1) to (5) in the foregoing.

The display 18 (28) may be configured to display, in addition to the display items in FIG. 8, at least one of the measurement values (the number of shared photons, the sample QBER, the QBER, the information leakage amount, and the processing time) of the respective pieces of processing, for example. The display 18 (28) may be configured to further display, in addition to those measurement values, the initial values corresponding to the respective measurement values. The display 18 (28) may be configured to display, for those measurement values, a graphic chart plotted in the time series in the same manner as that illustrated in FIG. 10, and in addition to this, may display the line indicative of the initial value of the respective measurement values.

While both the transmitter 1*a* and the receiver 2*a* are to include the display (the display 18, 28) as illustrated in FIG. 7 in the foregoing, they are not limited to this, and either the transmitter 1*a* or the receiver 2*a* may be configured to include the display. For example, when both the transmitter 1*a* and the receiver 2*a* include the displays and either the transmitter 1*a* or the receiver 2*a* only includes the estimator, it is sufficient that the estimator transmits the calculated estimated value of secure key rate to the QKD apparatus that is not provided with an estimator via a classical communication channel.

Second Modification

A QKD apparatus according to a second modification will be described with a focus on the difference from the QKD apparatus (the transmitter 1*a* and the receiver 2*a*) in the above-described first modification. The QKD apparatus in the second modification further includes a determiner and a notifier, in addition to the respective functional units included in the QKD apparatus in the first modification.

Figure 12:
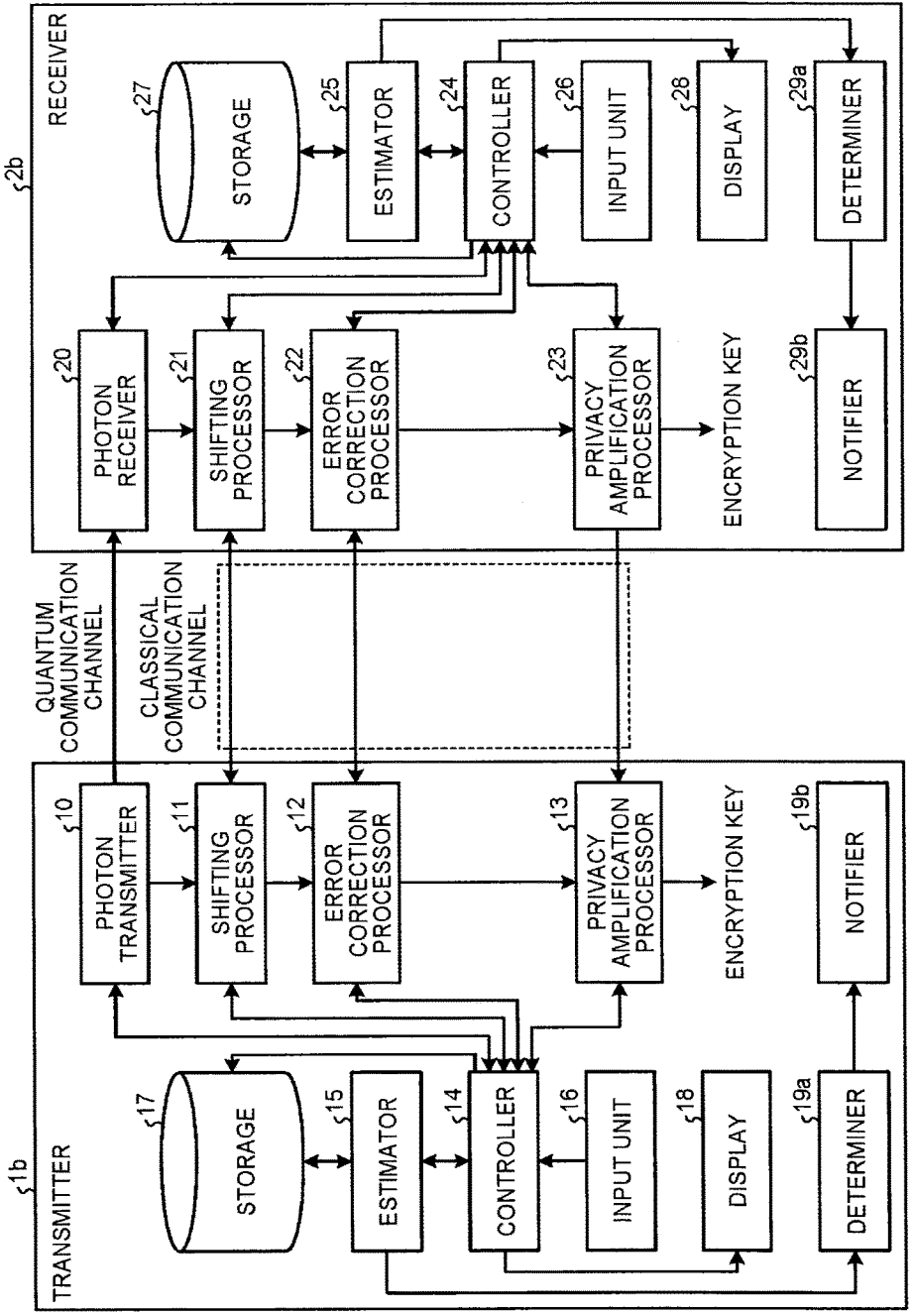
FIG. 12 is a block diagram illustrating one example of the configuration of functional blocks of a QKD apparatus according to a second modification.

FIG. 12 is a block diagram illustrating one example of the configuration of functional blocks of the QKD apparatus in the second modification. With reference to FIG. 12, the configuration of functional blocks of the QKD apparatus (a transmitter 1*b*, a receiver 2*b*) in the second modification will be described.

As illustrated in FIG. 12, the transmitter 1*b* includes the photon transmitter 10 (which may be referred to as a quantum-key sharer), the shifting processor 11 (which may be referred to as a shifter), the error correction processor 12 (which may be referred to as a corrector), the privacy amplification processor 13 (which may be referred to as a privacy amplifier), the controller 14, the estimator 15, the input unit 16, the storage 17, the display 18, a determiner 19*a*, and a notifier 19*b*.

The determiner 19*a* is a functional unit that determines whether the estimated value of secure key rate calculated by the estimator 15 satisfies a given condition. The determiner 19*a* further causes the notifier 19*b* to notify when the given condition is satisfied. For example, the determiner 19*a* is assumed to be configured to determine whether the estimated value of secure key rate has reached an operational level as the given condition, and when the estimated value is at the operational level or higher, the determiner 19*a* causes the notifier 19*b* to notify of that fact. Alternatively, the determiner 19*a* may be assumed to be configured to determine whether the estimated value of secure key rate has fallen below a level at which operation is disabled as the given condition, and when the estimated value is below the level at which operation is disabled, the determiner 19*a* may cause the notifier 19*b* to notify of that. The determiner 19*a* is implemented by the CPU 80 illustrated in FIG. 2 reading out and executing the computer program stored in the auxiliary storage device 86 and others onto the RAM 82. The determiner 19*a* may be implemented by a hardware circuit.

The notifier 19*b* is a functional unit that notifies, based on a command of the determiner 19*a*, by audio output and others that, when the determiner 19*a* determines that the estimated value of secure key rate satisfies the given condition, the value satisfies the given condition. The notifier 19*b* is implemented by the speaker 88 illustrated in FIG. 2.

As illustrated in FIG. 12, the receiver 2*b* includes the photon receiver 20 (which may be referred to as a quantum-key sharer), the shifting processor 21 (which may be referred to as a shifter), the error correction processor 22 (which may be referred to as a corrector), the privacy amplification processor 23 (which may be referred to as a privacy amplifier), the controller 24, the estimator 25, the input unit 26, the storage 27, the display 28, a determiner 29*a*, and a notifier 29*b*.

The determiner 29*a* is a functional unit that determines whether the estimated value of secure key rate calculated by the estimator 25 satisfies a given condition. The determiner 29*a* causes the notifier 29*b* to notify of that, when the given condition is satisfied, the given condition is satisfied. The determiner 29*a* is implemented by the CPU 80 illustrated in FIG. 2 reading out and executing the computer program stored in the auxiliary storage device 86 and others onto the RAM 82. The determiner 29*a* may be implemented by a hardware circuit.

The notifier 29*b* is a functional unit that notifies, based on a command of the determiner 29*a*, by audio output and others that, when the determiner 29*a* determines that the estimated value of secure key rate satisfies the given condition, the value satisfies the given condition. The notifier 29*b* is implemented by the speaker 88 illustrated in FIG. 2.

The notifiers 19*b* and 29*b* are not limited to outputting sound, and may be configured to notify by a lamp display and others. The display 18 (28) may be configured to change the display format (font color, color of bar chart, and others) of the estimated value of secure key rate or to display a message stating that the given condition is satisfied, when the estimated value of secure key rate satisfies the given condition. The function in the display 18 (28) to change the display in this manner provides the same function as the notification function by the notifier 19*b* (29*b*).

As in the foregoing, the operator performs the adjustments of processing at the respective phases while checking the estimated value of secure key rate on the display 18 (28), and in addition to that, the notifier 19*b* (29*b*) is configured to notify the operator, when the determiner 19*a* (29*a*) determines that the estimated value satisfies the given condition, that the value satisfies the given condition. Consequently, the operator can not only check the estimated value visually but also recognize aurally that the given condition is satisfied (for example, the estimated value is at an operational level or higher), and thus the operator can perform the adjustment operation to improve the secure key rate more easily.

The computer program that is executed by the QKD apparatus in the above-described embodiment and the respective modifications may be embedded in the ROM 81 and the like in advance before it is provided.

The computer program executed by the QKD apparatus in the above-described embodiment and the respective modifications may be configured to be provided, as a computer program product, in a file of an installable format or of an executable format recorded on a computer readable recording medium such as a compact-disc read only memory (CD-ROM), a flexible disk (FD), a compact disc recordable (CD-R), and a digital versatile disc (DVD).

The computer program executed by the QKD apparatus in the above-described embodiment and the respective modifications may be configured to be stored on a computer connected to a network such as the Internet and to be provided by downloading via the network. Furthermore, the computer program executed by the QKD apparatus in the above-described embodiment and the respective modifications may be configured to be provided or distributed via a network such as the Internet.

The computer program executed by the QKD apparatus in the above-described embodiment and the respective modifications can make a computer function as the foregoing respective functional units of the QKD apparatus. In the computer, the CPU 80 can read out and execute the computer program from a computer readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum-key distribution apparatus comprising:
   a quantum-key sharer configured to perform photon sharing processing in which a stream of photons is shared with another quantum-key distribution apparatus by quantum key distribution via a quantum communication channel for photons and to acquire a photon bit string corresponding to the stream of photons based on generated basis information;
   a shifter configured to generate a shared bit string from the photon bit string by performing shifting processing based on the basis information on the quantum-key sharer and on the another quantum-key distribution apparatus;
   a corrector configured to generate a corrected bit string by correcting errors included in the shared bit string by performing error correction processing;
   a privacy amplifier configured to generate encryption keys by performing privacy amplification processing in which the corrected bit string is compressed based on the number of errors; and
   an estimator configured to estimate, at execution phases of respective pieces of processing of the photon sharing processing, the shifting processing, the error correction processing, and the privacy amplification processing, an encryption-key generation rate indicative of a generation amount of the encryption keys per unit time based on an output value output in processing that has been performed out of the respective pieces of processing and a given value corresponding to an output value of processing not yet performed out of the respective pieces of processing.

2. The quantum-key distribution apparatus according to claim 1, wherein the given value is a value defined based on a past value of the output value-corresponding to the given value.

3. The quantum-key distribution apparatus according to claim 1, wherein
the quantum-key sharer outputs the number of photons of the stream of photons shared by performing the photon sharing processing as the output value,
the corrector calculates an error rate in the quantum communication channel from the number of errors by performing the error correction processing and outputs the error rate as the output value, and
the privacy amplifier outputs processing time until the encryption key is generated based on the stream of photons by performing the privacy amplification processing as the output value.

4. The quantum-key distribution apparatus according to claim 3, wherein the shifter calculates a tentative error rate in the quantum communication channel based on bit information on a part of the shared bit string generated by performing the shifting processing and outputs the tentative error rate as the output value.

5. The quantum-key distribution apparatus according to claim 1, further comprising a display configured to display information concerning an estimated value of the encryption-key generation rate estimated by the estimator.

6. The quantum-key distribution apparatus according to claim 5, wherein the display displays information indicative of changes in the estimated value in time series as the information concerning the estimated value.

7. The quantum-key distribution apparatus according to claim 1, further comprising a controller configured to make adjustments in operation of processing that is being performed when the estimated value is estimated by the estimator out of the respective pieces of processing and that is on a downstream side, based on a difference between an estimated value of the encryption-key generation rate estimated by the estimator, and a value of the encryption-key generation rate that is obtained based on the given value corresponding to the respective pieces of processing when all of the respective pieces of processing have not been performed.

8. The quantum-key distribution apparatus according to claim 7, further comprising:
an input unit configured to receive operating input; and
a display configured to display information concerning the estimated value estimated by the estimator, wherein
the controller performs the adjustments in accordance with operating input received by the input unit based on the information concerning the estimated value displayed on the display.

9. The quantum-key distribution apparatus according to claim 8, further comprising:
a determiner configured to determine whether the estimated value satisfies a given condition; and
a notifier configured to notify, when the determiner determines that the estimated value satisfies the given condition, that the value satisfies the given condition.

10. A quantum-key distribution method comprising:
performing photon sharing processing in which a stream of photons is shared with another quantum-key distribution apparatus by quantum key distribution via a quantum communication channel for photons to acquire a photon bit string corresponding to the stream of photons based on generated basis information;
generating a shared bit string from the photon bit string by performing shifting processing based on the basis information at the quantum-key sharing and the basis information on the another quantum-key distribution apparatus;
generating a corrected bit string by correcting errors included in the shared bit string by performing error correction processing;
generating encryption keys by performing privacy amplification processing in which the corrected bit string is compressed based on the number of errors; and
estimating, at execution phases of respective pieces of processing of the photon sharing processing, the shifting processing, the error correction processing, and the privacy amplification processing, an encryption-key generation rate indicative of a generation amount of the encryption keys per unit time based on an output value output in processing that has been performed out of the respective pieces of processing and a given value corresponding to an output value of processing not yet performed out of the respective pieces of processing.

11. A computer program product comprising a computer-readable medium containing a program executed by a computer, the program causing the computer to execute:
performing photon sharing processing in which a stream of photons is shared with another quantum-key distribution apparatus by quantum key distribution via a quantum communication channel for photons to acquire a photon bit string corresponding to the stream of photons based on generated basis information;
generating a shared bit string from the photon bit string by performing shifting processing based on the basis information at the quantum-key sharing and the basis information on the another quantum-key distribution apparatus;
generating a corrected bit string by correcting errors included in the shared bit string by performing error correction processing;
generating encryption keys by performing privacy amplification processing in which the corrected bit string is compressed based on the number of errors; and
estimating, at execution phases of respective pieces of processing of the photon sharing processing, the shifting processing, the error correction processing, and the privacy amplification processing, an encryption-key generation rate indicative of a generation amount of the encryption keys per unit time based on an output value output in processing that has been performed out of the respective pieces of processing and a given value corresponding to an output value of processing not yet performed out of the respective pieces of processing.

* * * * *